United States Patent [19]

Salesky

[11] Patent Number: 4,602,334

[45] Date of Patent: Jul. 22, 1986

[54] VEHICLE TRAVEL CONTROL DEVICE

[76] Inventor: Leonard Salesky, 41 Polk St., Riverside, N.J. 08075

[21] Appl. No.: 546,969

[22] Filed: Oct. 31, 1983

[51] Int. Cl.⁴ .............................................. G06F 15/50
[52] U.S. Cl. .................... 364/424; 364/461; 318/587; 340/903; 180/168
[58] Field of Search ............... 364/424, 436, 438, 460, 364/461; 318/587; 180/167-169; 340/903

[56] References Cited

U.S. PATENT DOCUMENTS

| | | | |
|---|---|---|---|
| 3,147,817 | 9/1964 | DeLiban | 180/168 |
| 3,556,244 | 3/1968 | Gray | 318/587 |
| 3,817,344 | 6/1974 | Asano et al. | 318/587 |
| 4,049,961 | 9/1977 | Marcy | 180/169 |
| 4,063,237 | 12/1977 | Nier et al. | 340/903 |
| 4,168,760 | 9/1979 | Paul, Jr. et al. | 318/587 |
| 4,284,160 | 8/1981 | DeLiban et al. | 318/587 |
| 4,379,497 | 4/1983 | Hainsworth et al. | 340/903 |
| 4,401,181 | 8/1983 | Schwarz | 180/168 |
| 4,465,155 | 8/1984 | Collins | 318/587 |

Primary Examiner—Gary Chin
Attorney, Agent, or Firm—Thomas A. Lennox

[57] ABSTRACT

A vehicle direction control device is provided including three receivers in the vehicle with the center receiver controlling the direction along a primary cable in the roadway with change of direction cable systems taking over control through a side receiver originally parallel with the main line of travel, diverging to a new direction and then picking up a parallel relationship with a new primary line of travel automatically switching back to the center receiver control along the new line of travel.

24 Claims, 10 Drawing Figures

VEHICLE TRAVEL CONTROL DEVICE

BACKGROUND OF THE INVENTION

This invention relates to a travel control system for vehicles, such as a roadway to vehicle controlling system to control the travel of automobiles along the roadways.

The public has long had a love affair with the automobile and the open road. Public transportation fits certain needs of the commuting public, but does not offer the freedom of choice, privacy and the advantages of individually controlling the vehicle's start, route and destination. However, the price of the personally controlled vehicle is the shocking loss of life and property on the highways each year. Most automobile accidents are caused by negligence, inattentiveness or the incapacity of the driver. There is a great need to provide a system which can allow the operator of a vehicle to individually choose the time of leaving, the destination, the route, the degree of privacy, and even manual change of the direction to be taken but take out of the operator's hands the means for his destruction. A device and system is needed to allow control of the vehicle by the driver or by a preprogrammed route through an electronic-mechanical device capable of essentially insuring safe passage of the vehicle on the highways. While the above need is recognized as applicable to the automobile and the highways, it should be understood that the invention has utilization beyond this particular need.

SUMMARY OF THE INVENTION

It is an object of this invention to provide a vehicle control device capable of controlling the direction from the start to a chosen destination along a chosen route without the direct involvement of a driver.

It is a further object of this invention to provide a vehicle control device capable of receiving commands from the driver as to the direction of travel, including a change of lane, turning a corner and the like, and carrying out that command without involving the driver in the movement of the wheel, in the choice of speed or the exact path of the direction change.

It is a particular object of this invention to provide device and system by which the operator of the vehicle can control the choice of starting time, route and destination, as well as enjoy his privacy, but without the necessity of driving the vehicle at any time.

A further object of this invention is to provide a vehicle control device which essentially assures safety of the vehicle and the operator from loss of control or collision with other automobiles or objects.

It is a further object of this invention to provide a vehicle control device and system which does not depend upon the capacity of the operator such that the vehicle can transport the occupant regardless of age, skill, intoxication, drug influence or physical condition.

It is an additional object of this invention to provide a vehicle control device which, despite having aspects of the personally directed vehicle, does not require attention by a driver, thus allowing all the vehicle occupants to devote their time to other pursuits.

It is a further object of this invention to provide a communication link directly to the vehicle and to other communication systems to allow communication of road conditions, location of the vehicle along the roadway, and location of stolen automobiles.

It is a particular object of this invention to provide a vehicular control device which allows preprogramming the trip into a system and cause the vehicle to follow that trip to the destination.

It is an additional object of this invention to provide a vehicular control device, particularly effective for automobiles on the open roadway which allows mixed traffic controls to operate at the same time such that some of the automobiles are automatically controlled, some may be partially automatically controlled and some may be manually operated in a fashion similar to that on today's roads.

It is a specific object of this invention to provide a multiple receiver device on the vehicle such that if the primary receiver loses signal contact with the line of travel cable, the chances are improved that a second receiver device will pick up the signal and safely stop the vehicle.

It is a particular object of this invention to provide a vehicular control device which allows the control of the speed of the vehicle to be controlled by the signals from the roadway.

The apparatus of this invention to control the direction of travel of a vehicle includes a first cable system including a cable in a travel surface defining a first line of travel. The cable carries and radiates a signal that is capable of being received by a first receiving device in the vehicle. At least one second cable system device and preferably at least two such devices include a cable in the road surface at any location where a change from the first line of travel is desired. The cable carries and radiates a signal capable of being received by a second receiving means in the vehicle. Each one of the second cable system devices includes at least one cable including a first length of cable in the road surface parallel to the first line of travel, a second length of cable in the road surface continuing from the end of the first length but following a direction of travel diverging from the first line of travel, and a third length of cable in the road surface continuing from the end of the second length, but following a direction of travel parallel to a second line of travel. These three lengths of cable may be connected and continuous or may be separated at any juncture. The separation points are chosen not necessarily because of a change of direction but because of a desire to have the capability of generating separate signals beginning at that point. The control apparatus of this invention further includes a third cable system device in the road surface defining a second line of travel and carrying and radiating a signal to the first receiving means in the vehicle. Preferably, each cable system device includes at least one generator device connected to generate a signal for a length of the cable.

Throughout the specification and the claims, the term "in the surface" is used to describe placement of the cable in or on the road surface. This terminology is not intended to limit the scope of the invention as it should be recognized that the cable may be imbedded in the road surface or may be laid essentially on the surface and merely protected from the weather and wear.

Throughout the specification and claims, references made to a "radar" device as having the capability of issuing a signal and receiving reflections of that signal off a neighboring body to determine the distance and/or velocity between the vehicle and a nearby body. The term "radar" is not intended to limit the scope of this invention to a particular form of device capable of producing those results. It is recognized that this term is intended to include but not be limited to common pulse radar devices, Doppler radar, diplex Doppler radar, sonar and other like devices capable of producing the same result. The diplex radar device is preferred to provide the added information as to the relative velocity and position (how far away) of the vehicle and the object, such as another moving vehicle.

Another term that is used throughout the specification and claims is a "servo" device. This term is again not intended to limit the scope of the coverage, but is intended to describe a generic group of devices capable of receiving a signal and acting on that signal and carry out a mechanical action, such as activation of a brake, steering, or accelerator. The servo device includes electrical, hydraulic, mechanical and other powered activating devices.

The term "cable" as used in specification and claims is ot intended to restrict the scope of the invention. Although able may be a single or multiple strand of metal, round or flat, embedded in or laid on top of the road surface, it is not so restricted. The term "cable" is intended to include any material that is capable of radiating a signal as generated from the cable itself or merely by a reflection of a signal generated from other source, such as the vehicle traveling and guided by the cable.

DESCRIPTION OF PREFERRED EMBODIMENTS

Figure 1:
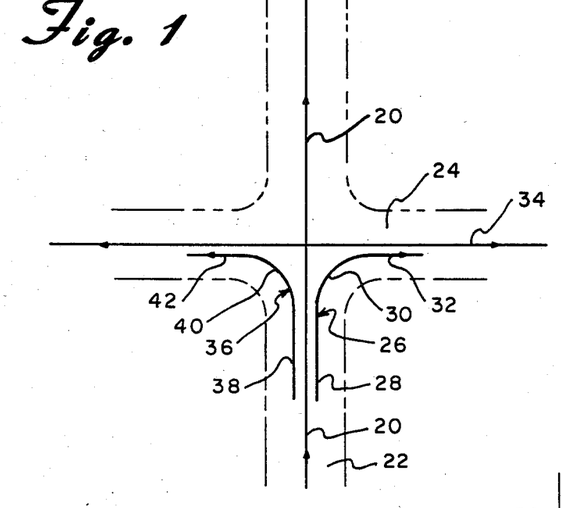
FIG. 1 is a diagram of the basic configuration of a cable network of this invention.

FIG. 1 illustrates a simple version of a vehicle travel control device of the present invention. Straight line 20 represents a cable imbedded in roadway 22 emitting a signal from a generator device illustrated later. Cable 20 defines a first line of travel on roadway 22 which intersects a second roadway 24 at a right angle. Cable 20 continues through the intersection and may, for example, generate the same signal on both sides and through the intersection. Alternatively, sections of cable 20 may be connected to different generators with each having the capability of generating different signals which may, for example, control the speed of the vehicle over that stretch of cable. As cable 20 approaches the intersection, a second cable control device 26 begins in a parallel arrangement with cable 20. This first length of cable 28 is positioned to the right and parallel with cable 20 in a position such that a right pick up receiving device on the car recognizes the signal emitting from cable 28. The center pick up receiving device on the car continues to control the path of the auto along cable 20 until some command is given. A command may be given by the operator prior to or at the time of entering the stretch where cable 28 is in parallel arrangement. In the alternative, the path may be preprogrammed to make a right turn at this point. Cable system 26 continues from the end of section 28 with diverging cable section 30 which in this case follows a path in a right curve. Again, section 30 of cable system 26 is described by its path and should not necessarily be considered connected directly to cable section 28 although it certainly may be a continuous cable. Cable system 26 continues with third section 32 which extends from curve section 30 and forms a path parallel with cable system 34 which defines a line of travel along roadway 24. As the car travels along third section cable 32, it is initially controlled by the right hand pick up receiving device in the car and by its spacing places the center main pick up receiving device in the car in position to receive the signal from cable 34. It is preferred that when the vehicle reaches the point where it is controlled by third section cable 32 and a signal from cable 34 is received, that there be an automatic switch over to have the vehicle controlled by the center pick up receiving device picking up the signal from cable 34. Similarly, a left hand turn second cable device 36 is depicted with first section 38 of the cable parallel to cable 20 positioned to the left of the line of travel to generate a signal capable of being picked up by the left pick up receiver in the automobile. Continuing from the end of cable 38 is divergent left cable section 40 which forms a new pathway away from the line of travel of cable 20 to third section 42 of cable system 36 which is in parallel configuration with main cable system 34. While this configuration design illustrates the basic elements of the system, it is not practical for most roadway systems.

Figure 2:
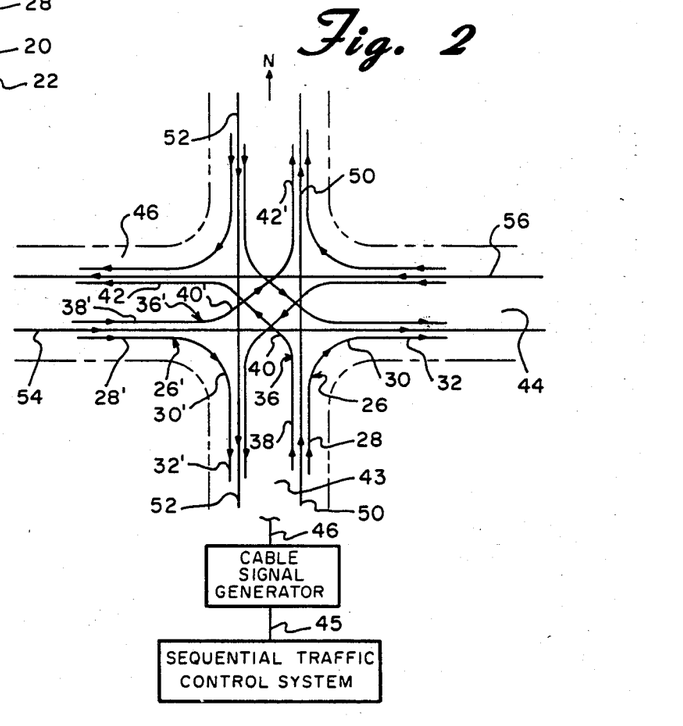
FIG. 2 is a diagram of a two way intersection including vehicle control device of this invention.
Figure 3:
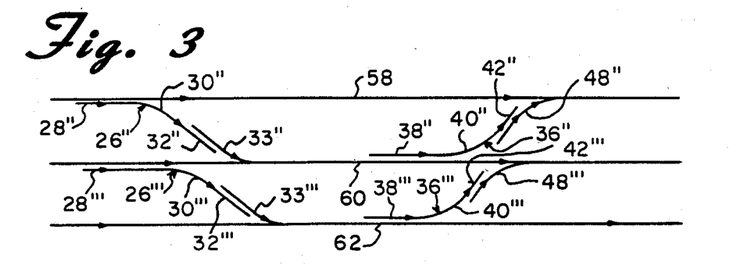
FIG. 3 is a diagram of lane change configurations including vehicle control device of this invention.

More complicated and more practical systems are illustrated in FIGS. 2 and 3. For the purposes of simplicity, the same numbering systems are used in these diagrams with primes to label the various pathways. In FIG. 2, a two lane North-South roadway 43, meets East-West two lane roadway 44. With various right turn cable devices series 26 and various left turn cable devices 36, all the various options of turning may be accomplished. Some of the duplicative turns are not numbered for clarification purposes. In this illustration, main cable 50 controls the line of travel in a northerly direction on roadway 43 while main cable 52 defines a southerly line of travel direction along roadway 43. Cable 54 defines the easterly direction line of travel and cable 56 defines the westerly direction line of travel along roadway 44. As illustrated, right turn cable device 26 provides the capability of turning from a northerly direction along cable 50 on roadway 43 to an easterly direction on roadway 44 following cable 54. Left hand cable device 36 provides the capability of turning a vehicle travelling northerly on cable 50 along roadway 43 to a westerly direction following cable 56 on roadway 44. Similarly, cable device 26' takes an easterly travelling car and turns it south while left hand cable device 36' takes an easterly travelling car and turns it north. A sequential traffic control system is located near the intersection connected with a plurality of electrical lines 45 to the same number of oscillator means as the number of sections of cable individually controlled throughout the intersection. In this type of intersection, there is at least 12 individual oscillator devices connected through individual electrical lines 46 to each section of cable. Although there may be more than one section of cable for cables 50, 52, 54 and 56, it is possible to have one oscillator device control each cable through the entire intersection. Likewise, there is at least one oscillator for each right turn cable device 26 and so on. Actually, it is preferred that each of these cables be sectioned off either to allow individual control of speed or to have short breaks to avoid interference of signals with crossing cables. The sequential traffic control system may be mechanical or electronic, carrying out the same general function as traffic controllers timing and switching a traffic light. Because of crossing paths across the intersection, it may be necessary to stop vehicles to wait for other crossing cars rather than to merely merge them through the intersection. It should be recognized that although twelve individual oscillator devices have been suggested above, there may be a limited number of oscillator devices with the capability of switching from section to section to correspond with the sequential traffic control. Since sequential traffic controll will require use of only certain cable systems in sequence, an individual oscillator may operate in the same sequence and thus reduce the amount of equipment necessary to control the intersection.

FIG. 3 provides a configuration for lane changing between left lane 58, center lane 60 and right lane 62, all travelling in the same direction, each controlled by cables of the same number. Again, using the same numerical designations, right cable control device 26" provides the capability of changing from left lane 58 to center lane 60 and right control cable device 26"' provides the capability of changing from center lane 60 to right lane 62. Similarly, left hand control device 36" allows changing from center lane 60 to left lane 58 and left control device 36" allows changing from center lane 60 to left lane 58 and left control device 36"' allows changing from right lane 62 to center lane 60. In lane change configurations, in order to have the correct receiver system on the vehicle pick up the correct cable control device signal, it is necessary to provide cable appendage 33 connected to the cable system of the second line of travel, in this case 60 or 62 with cable appendage 33" extending toward the line of travel and into parallel relationship with third section cable 32, the center receiving system 66 comes within the capture range and takes over operation of the vehicle. Similarly, cable appendage 33"' extending from cable line of travel 62 extends into parallel relationship with third section cable 32"' so that the center, main receiver device assumes control of the vehicle. The same basic change of direction configuration is utilized, requiring that the second cable control device 26 contain the same three cable elements. Similarly, left hand control device 36" and 36"' and with third section 42 in parallel relationship with appendage 48" or 48"' which merge into and connect directly with left lane 58 cable system and center lane 60 cable system. Again, the key arrangement is that the third section 42 come into parallel arrangement with appendage 48 so that the center, main receiver device on the vehicle may take control and guide the vehicle along the second and new line of travel. As pictured in FIG. 3, the lane changes are relatively sharp, but would in practice be a good deal more gradual and there would be substantial periods of parallel relationship so as to assure transfer of control between the receiver devices.

Figure 4:
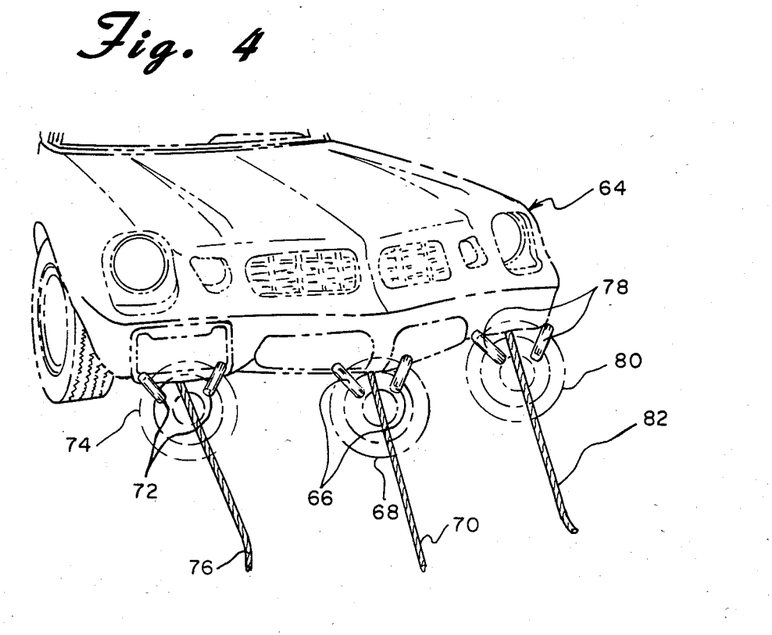
FIG. 4 is a perspective view of the front end of an automobile illustrating the positioning of cables and receiving devices in the vehicle.

In FIG. 4, a perspective view of the front of auto 64 is equipped with center main receiving device 66 receiving signal 68 emitting from main center cable 70. Right cable receiving device 72 is capable of receiving signal 74 from right turn cable device 76. Left receiving device 78 is capable of receiving signal 80 emitting from left turn cable device 82. Each receiving device includes two coils, each being shielded to pick up signals only from below. Signals 68, 74 and 80 radiate outwardly from the respective cables, the source of the radiation.

Figure 5:
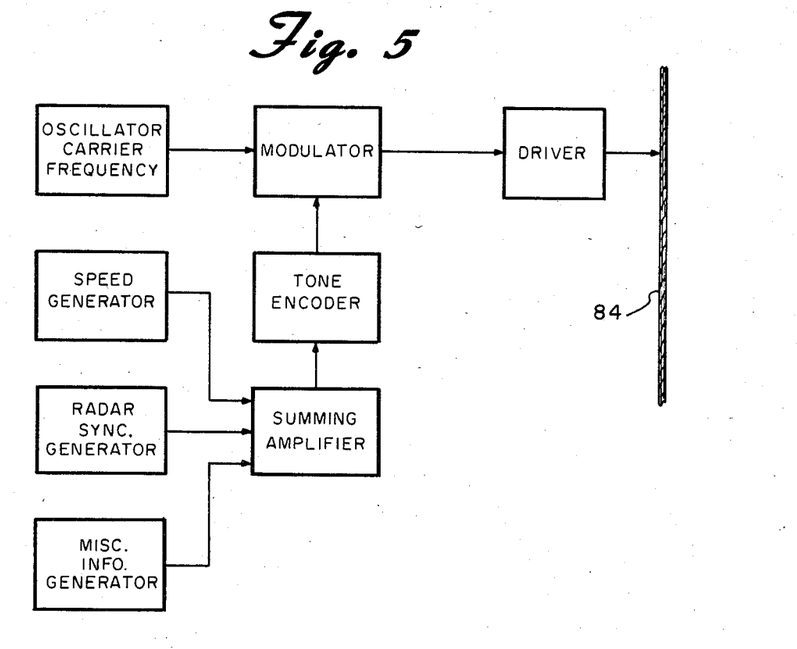
FIG. 5 is a diagram of a cable signal generator of the invention.

The cable signal generator diagramed in FIG. 5 is attached to cable 84 at the roadside to generate signals which are picked up by the receiving devices in the vehicle. These signals may carry any desired message including location, the speed at which the vehicle may travel along that stretch of cable, a radar synchronization pulse, other control information which may be fed directly to an onboard controller or computer, message information to the operator and any other signal information. The oscillator generates the carrying frequency to the modulator. The generators include the speed generator, the radar synchronization generator and other control and miscellaneous information generators, all of which generate signals to a summing amplifier which feeds the modulator. The signal is received by the driver which drives cable 84. These generators and in particular the speed generator may be individually adjustable by signal received from a central source, such as a manual traffic control unit which adjusts the speeds depending upon weather conditions and the amount of traffic. A miscellaneous signal may be that there is a merge of two lanes up ahead. The computer then commands a lane change maneuver using a device similar to that illustrated in FIG. 3.

Figure 6:
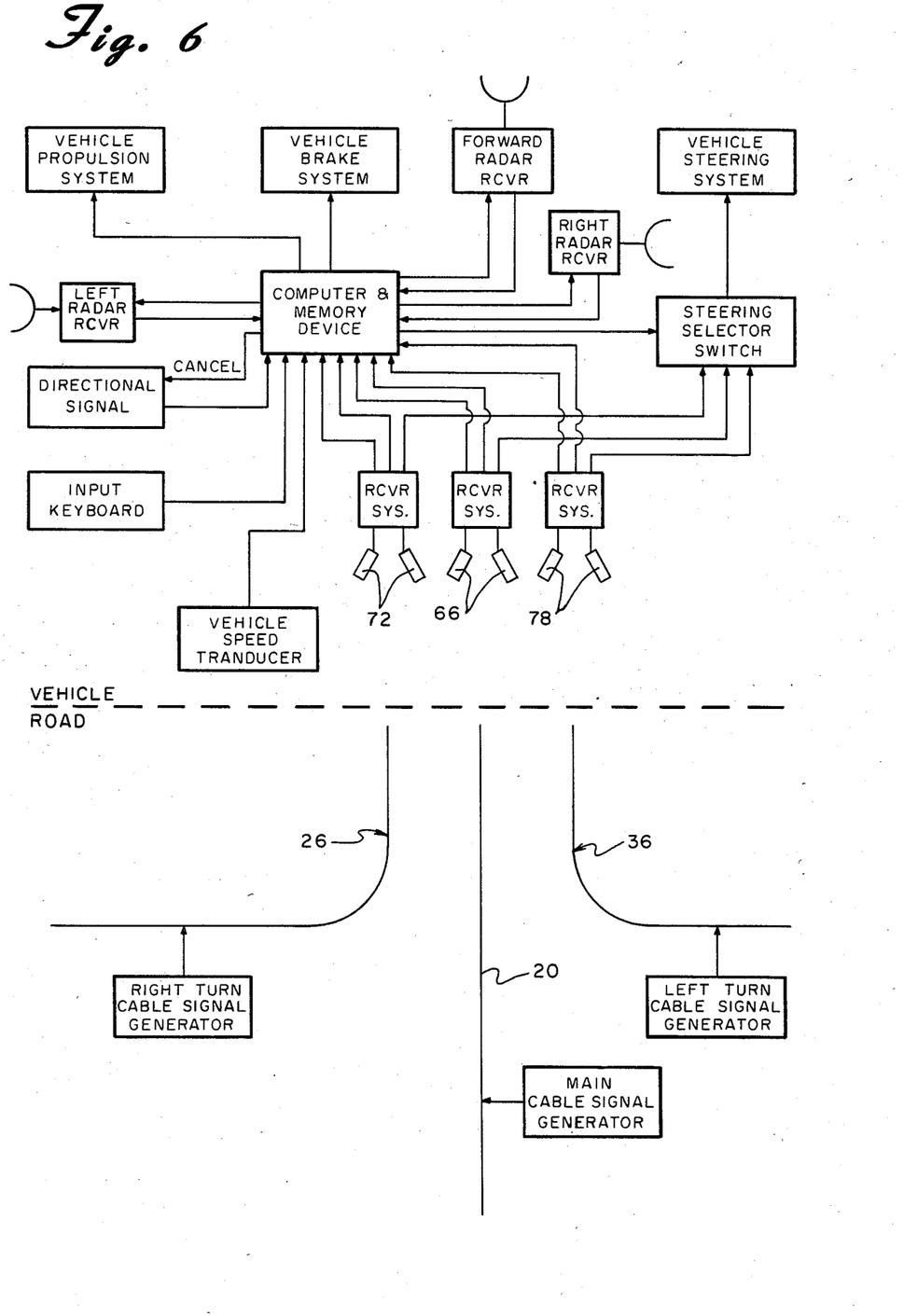
FIG. 6 is a diagram of elements of a control device of the invention.

In FIG. 6, an onboard receiver and control device in the vehicle is pictured above the dotted line while the road located control device is pictured below the dotted line in alignment with the receivers. Main cable 20 is shown with a main cable signal generator device as illustrated in FIG. 5. Similarly, right turn second cable control device 26 and left turn second cable control device 36 are equipped with like generator devices. The vehicle is equipped with three receiver systems which will be further described with FIGS. 7 and 8. Each receiver system is equipped with center coils 66 which receive signals from main cable 20, right coils 72 which receive signals from right cable device 26, and left coils 78 which receive signals from left cable system 36. Signals from the receiver systems are continuously fed to the steering selector switch. Each receiver system is also connected to computer and memory device, capable of retaining commands and acting upon signal inputs to transmit a further signal to outboard devices. The computer device chooses one of the signals and sends the signal to the steering selector switch which in turn transmits a command to the vehicle steering system from one of the three receiver systems. As further illustrated in FIG. 7, signals directly from the road cable control device, such as appropriate speed of travel, and the like are fed directly to the computer. Further, a signal is received by the computer indicating whether or not the tracking signal is indeed present. The compute must receive a signal that at least one of the cable control device signals are present, for if there is no signal, there is an automatic shut down and stoppage of the vehicle for a fail safe configuration. Thus, the computer is advised whether the receiver system has acquired a signal from the appropriate cable device if the signal is required for operation and is not present, then the vehicle must be stopped. In this fashion, roadway information is transmitted to the computer directly. The steering system is not critical to this invention. A suitable system is described in U.S. Pat. No. 2,990,902 to R. S. Cataldo, issued July 4, 1961, incorporated herein by reference. The computer carries the synchronizing method and directs the forward, left or right radar receiver to generate pulses upon command. Generally, the radar should be operable only in the direction the vehicle is moving or intends to move. For example, when the vehicle is on the main cable, only the forward radar receiver will be commanded to operate. In case of a lane change, for example to the left, the left radar receiver is commanded to operate. Information including the frequency shift of the signal and the time of echo is transmitted to the computer device causing appropriate action. The pulse of the radar is synchronized with other automobiles so as to avoid interference. It should be clear that while the above example and the later claims speak in terms of three radar devices, there are advantages or at least equal effectiveness to using one radar device with multiple antennas or even a single radar device with one antenna capable of being aimed by the computer in different directions. Whenever three radar devices are mentioned, it is intended to include these other alternatives. Suitable radar devices for use in this invention are described in the article, *Diplex Doppler Radar for Automotive Obstacle Detection*, by James E. Stevens and Louis L. Nagy, in IEEE Transactions on Vehicular Technology, Vol. VT-23, No. 2, May 1974 and in the article *A Super-Regenerative Microwave Dopple Target Indicator* by C. J. Milner and G. S. Shell in the same periodical, Vol. VT-17, No. 1, October 1968, both articles incorporated herein by reference. The computer device controls the vehicle brake system and the vehicle propulsion system depending upon the signals received and the preprogrammed information. The directional signal provides means of manual control by the operator directing the computer to make a turn in either direction. The computer in turn cancels the directional signal to allow a new signal to be imposed on the computer for a later turn and to remove the command so as to avoid continuous right hand or left hand turns once the signal is given. The computer also receives information from a vehicle speed transducer indicating the speed of travel as well as from an input keyboard device allowing preprogram of the computer as to route, destination and to start or stop of the operation. Although not illustrated, a suitable display device to alert the operator and passengers as to the speed of travel, direction of travel, operations taking place and the like would all be provided.

Figure 7:
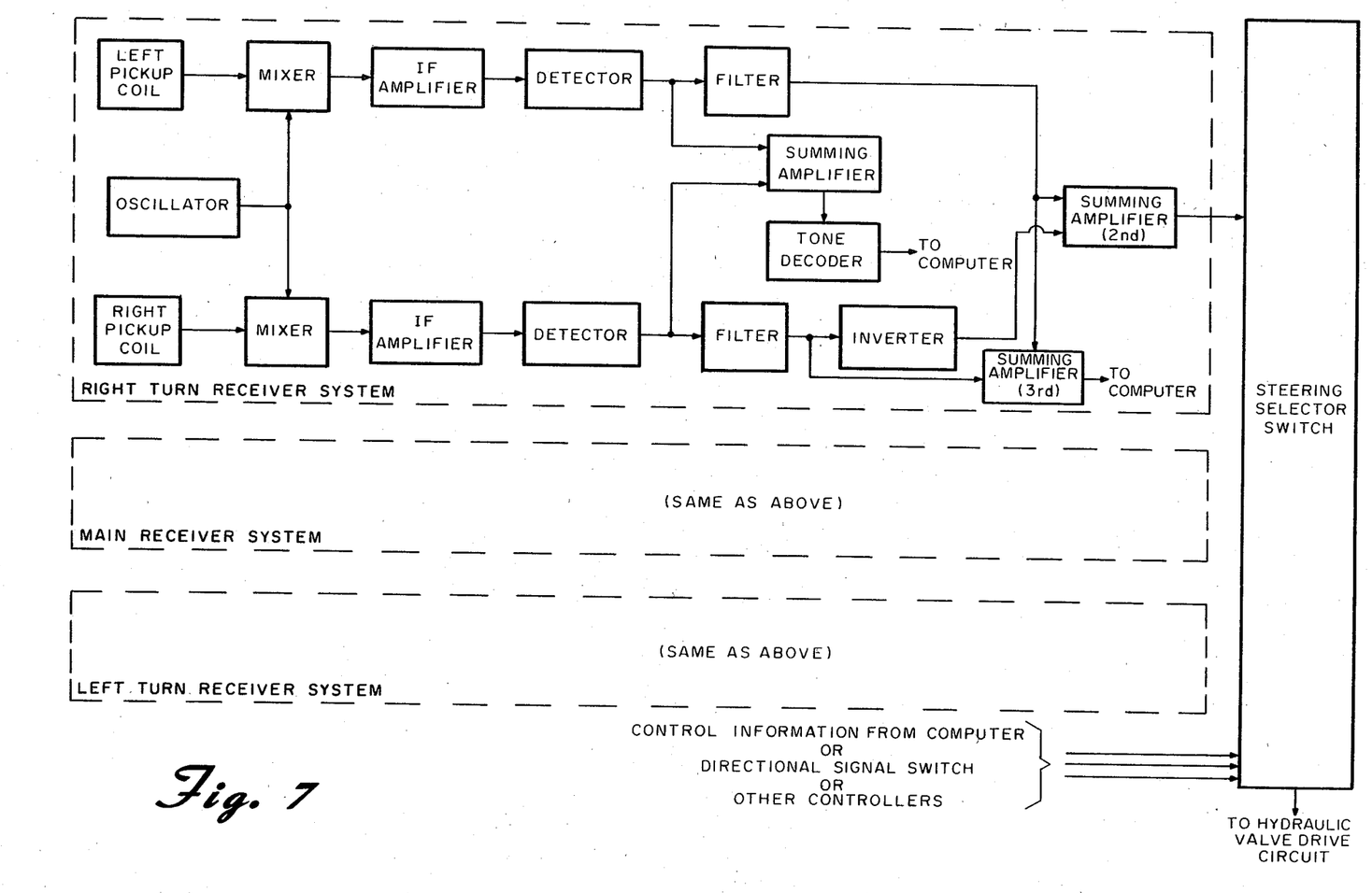
FIG. 7 is a diagram of receiver systems of the invention.

In FIG. 7, the three receiver systems are each connected to the steering selector switch which receives control information from the computer device, directional signal switch or other controllers and which in turn transmits signals to the hydraulic valve drive circuit. Each pick up coil receives a signal and transmits it to a mixer, each of which receives a signal from a local oscillator. The beat in the mixer produces a frequency which is amplified by the IF amplifier and fed to a detector. The signal is transmitted to a summing amplifier which receives signals from both the right and left pick up coils which takes the sum of the signals, transmits it to a tone decoder which conveys digital information, such as speed of travel, synchronization and the like, to the computer to be processed per its program. In addition, the signal from the left pick up coil is transmitted from the filter to a second summing amplifier. The signal from the right pick up coil is transmitted from the filter to an inverter and then to the same second summing amplifier. The subtractive result between the signals proportional in strength from each of the coils is an error signal transmitted to the steering selector switch to cause correction of the direction of travel of the vehicle per the signal. The signal from the filter from the right pick up coil together with the signal from the left pick up coil is fed to a third summing amplifier and the signal fed to the computer. This signal is basically to indicate if a tracking signal is present within the capture range of the pick up coils. This signal is a necessary component of the failsafe system so that if no signal is present, where there must be one for the vehicle to operate safely, the vehicle is automatically stopped. The main receiver system and the left turn receiver system are identical and transmit an error signal as to the position of the cable between the right and left coils of each system to the steering selector switch. An AM system with tone encoding is depicted here, however, any modulation and/or encoding-decoding system may be used.

Figure 8:
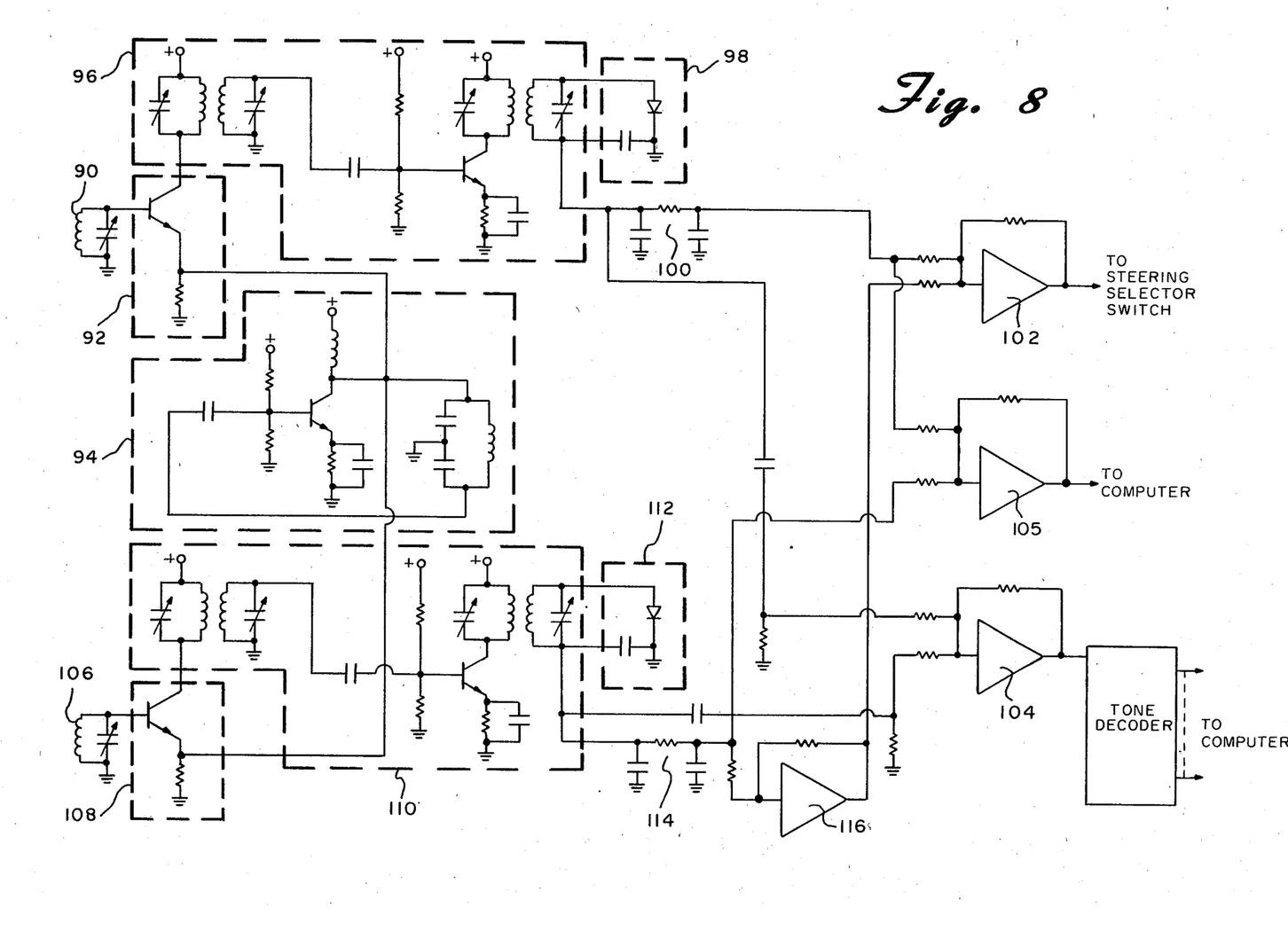
FIG. 8 is a circuit diagram of a receiver of the invention.

In FIG. 8, the circuit for one of the receiver systems, the main, right and left systems being identical is illustrated. Left pick up coil 90 tuned to the cable frequency feeds the signal to mixer 92 which also receives a signal from local oscillator circuit 94. The sum or the difference frequencies as the case may be, is fed to IF amplifier 96 and then to detector circuit 98. The signal is then fed to summing amplifier 104 which receives a second signal from the right pick up coil through a identical circuit which passes the summed circuit to a tone decoder chip which derives the digital information to be processed by the computer. The signal from the left pick up coil in addition to being fed to amplifier 104 is also fed to summing amplifier 102 through filter 100. The signal from right pick up coil 106 passes through mixer circuit 108 which receives an oscillation frequency from local oscillator circuit 94 and feeds the signal to IF amplifier circuit 110 which feeds the signal to detector circuit 112 through filter 114 and inverter 116 to summing amplifier 104. The effect of this circuit reaching amplifier 102 is to provide an error signal proportional to the difference between the signals received by the right and left coils which is passed to the steering selector switch. Summing amplifier 105 is fed signals from both pick up coil systems and feeds the failsafe information to the computer.

Figure 9:
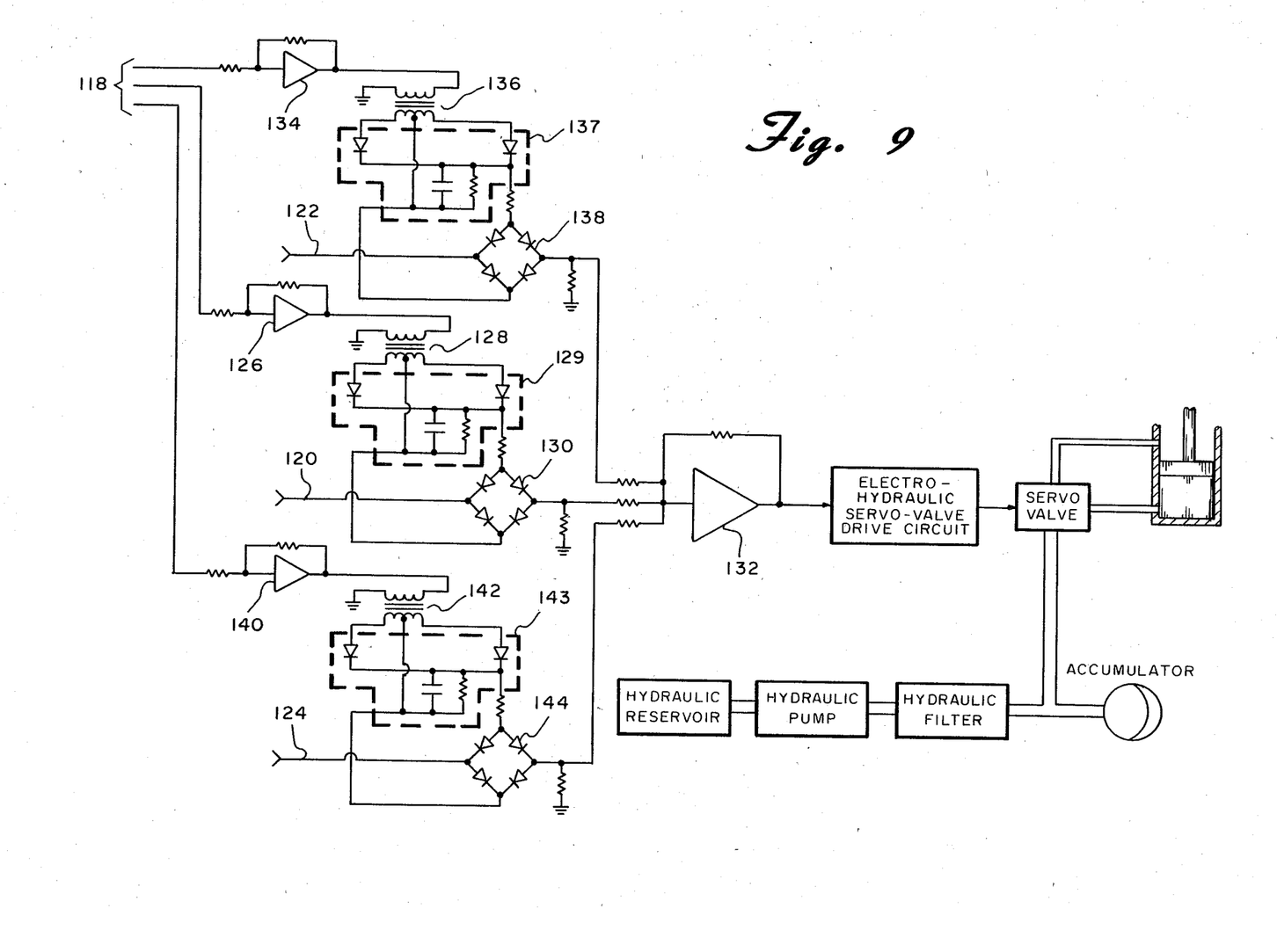
FIG. 9 is a circuit diagram of a steering selector switch and servo system of the invention.

The steering selector switch mechanism is illustrated in FIG. 9 receiving control information from the computer through lines 118. The computer as a result of information received determines which control signal is to be used to control the vehicle. In this diagram the main steering control signal enters at 120, right turn steering error signal enters at 122 and left turn steering turning error signal enters at 124. If the computer determines that the main steering control signal should control, a signal is sent through driver 126, transformer 128 and rectifier 129 to diode switch circuit 130 which when it receives current from the transformer and rectifier, all four diodes conduct and allow the main steering control signal from 120 through to summing amplifier 132 and to the servo system as illustrated and further described in the Cataldo patent referred to above. Similarly, if the computer determines that the right turn steering error signal should control, current is generated through driver 134, transformer 136 and rectifier 137 into diode switch circuit 138 which when receiving current, all diodes conduct allowing the right turn error signal to reach summing amplifier 132. When no current is impressed by the computer on diode circuit 130, the diodes do not conduct and the main steering error signal is blocked and cannot reach summing amplifier 132. The left turn steering error signal at 124 is similarly allowed to pass by a current impressed on driver 140 through transformer 142 and rectifier 143 to open diode switch circuit 144 so that the signal impressed on the left turn receiver system controls the servo system for steering the vehicle. This DC system has been shown for clarity but an AC circuit would be more practical to manufacture.

Although not illustrated, it is preferred to include a transmitter to transmit a signal from the vehicle to the cable. While no voice communication is expected from the vehicle, it is possible and it certainly may be useful to provide a medical emergency alert signal in order to receive a path signal to the nearest hospital. The cable signal generator may be designed to generate such a message upon receipt of a medical alert signal from the vehicle.

Figure 10:
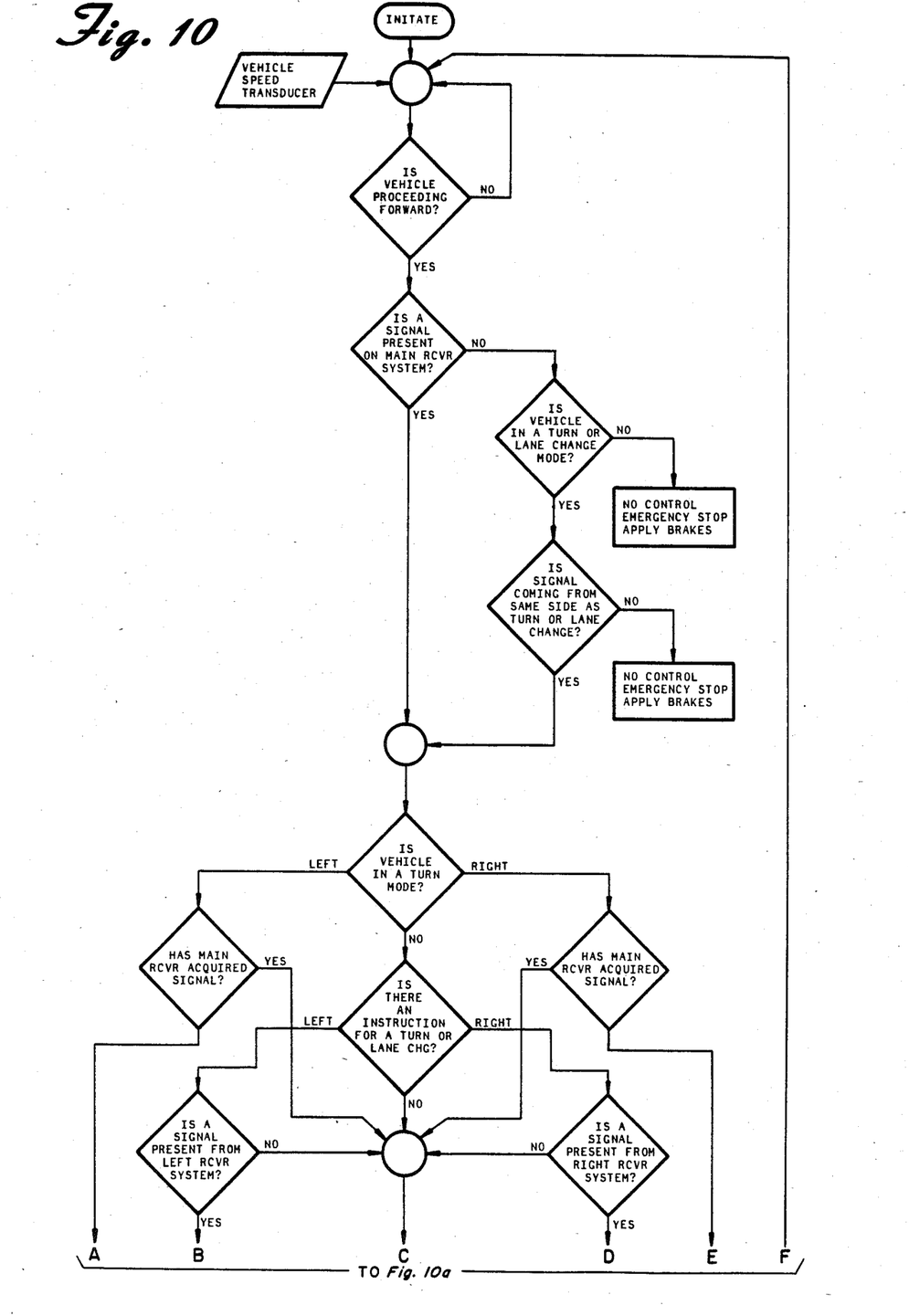
FIG. 10 is a flow chart of a computer program to operate the vehicle control system.
Figure 10A:
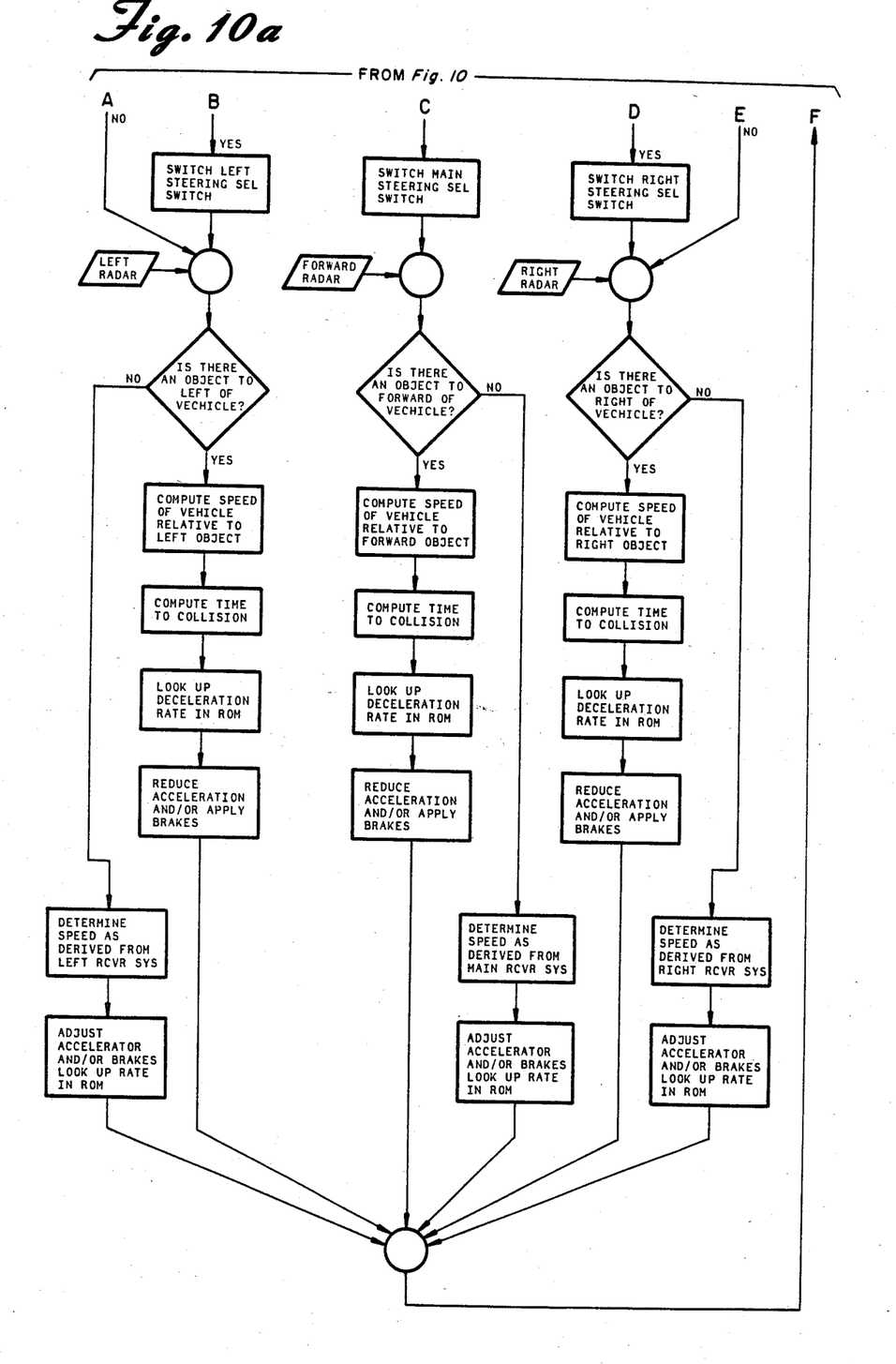

It is also preferred to program the vehicle computer so that on receipt of a suitable signal from the cable, the vehicle computer would respond to the cable through the above mentioned transmitter with the vehicle serial number. Upon receipt of the vehicle serial number, a roadside computer could compare the serial number with a list of stolen vehicles in its memory. The authorities would then be notified via telephone lines, that the stolen vehicle passed that point. It is particularly useful that the signal include modulation indicating the location of that particular point on the roadway. This information will be used by the computer to determine its position with respect to a pre-programmed route or to provide a visual display of the location of the vehicle along the roadway. The flow chart of FIG. 10 illustrates a program for the computer to control the vehicle control system of the present invention. Using this flow chart, a programmer may easily derive the necessary software for the computer.

It is preferred that each cable system include at least one generator connected to the cable to generate a signal for the length of the cable. This signal includes not only a guidance signal but also may contain a synchronizing signal for the radar systems in the vehicle to prevent interference as well as other signals including the location of the roadway to allow the operator or computer to determine the location of the vehicle at any time. It is also preferred that there be an oscillator receiver device connected to each generator to receive signals from other locations to control and change the signals, such as the signal indicating the speed at which the vehicle is to travel on that length of cable. One of the additional signals that may be generated in the cable is one that causes the vehicle upon command to follow the line of travel of one of the cable system devices, such as to turn off in case of an obstruction ahead and follow a detour route. A particularly preferred embodiment of this invention includes a program in the computer such that when a vehicle is under control of either the right or left hand cables and comes into parallel position with a cable system emitting a signal picked up by the center and primary receiver, that the primary receiver takes over control of the vehicle automatically.

It is preferred that the signal from the roadway carry information as to the safe speed of travel and that a rate decel eration be programed into the computer. Of course the term "computer" includes a dedicated system to replace the program.

It is preferred that the first cable system include a first generator device generating a signal in the cable indicating the speed the vehicle is to travel as well as a guidance signal along the cable. Also preferred is the second cable system including a second generator to generate a signal to the cable device indicating the speed of travel of the vehicle following the second cable system as well as a guidance signal along the cable. It is particularly preferred that the distance between the first cable system and the first length of cable of the second cable system correspond with the distance between the capture ranges of the first receiving device and the second receiving device. Similarly, it is particularly preferred that the distance between the third length of cable of the second cable system and the third cable system device correspond with the distance between the centers of capture ranges of the first receiving means and the second receiving means. The term "capture range" as used throughout refers to the space between the two coils of the pickup device within which a signal can be received and recognized. Of necessity, the capture ranges of the coil pairs must be directional and limited so that stray signals will not interfere with the operation of the vehicle. The critical distances between the cable systems correspond with the distance between the centers of the pick up ranges of the respective receiver systems on the vehicle. Although there are many instances where there will be only one second cable system at a particular location, it is preferred that there be in any system of this invention two second cable systems in the road surface. These two systems are a right cable system device positioned to the right of the first cable system and a left second cable system positioned to the left of the first cable system. If you assume that the right second cable system is described above, then the left second cable system operates in a similar fashion and has identical configurations except that the third length of cable of the system follows a third line of travel which in all practical systems will be different from the second line of travel. In many situations, this third line of travel may be parallel with the second line of travel, but travelling in an opposite direction. This third line of travel is defined by a fourth cable system in a road surface to carry and radiate a signal to the first receiving means in the vehicle.

In intersections, particularly of two way roadways, there are many situations where a cable system will cross over another cable system. In order to avoid interference and confusion of the receiver, it is preferred that a shield be interposed at the point of intersection sufficient to eliminate interference to the receiver of the crossing cable.

A particularly preferred apparatus of this invention to control the direction of travel of a vehicle includes a first cable system in a travel surface defining a first line of travel to carry and radiate a signal from a first generator device generating a guidance signal indicating the speed of travel for the vehicle wherein the signal is capable of being received by a first receiving device in the vehicle. The apparatus also includes at least one second cable system device in the road at any location where a change from the first line of travel is desired to carry and radiate a signal from a second generator device to generate a guidance signal and a signal indicating the speed of travel of the vehicle during the change in direction. The signal is capable of being received by a second receiving device in the vehicle. This second cable device includes at least one cable device including a first length of cable parallel to the first line of travel, a second length of cable abutting but not connected to the end of the first length of cable and following a direction of travel diverging from the first line of travel, and a third length of cable abutting but not connected to the end of the second length and following a direction of travel parallel to a second line of travel. A third cable system device in a travel surface defining a second line of travel to carry and radiate a signal from a third generator device generating a guidance signal and a signal indicating the appropriate speed of travel along the second line of travel is included in the apparatus. The positioning of the various elements are made such that the relative distance between the first cable device and the first length of cable of the second cable system device corresponds with the distance between the capture ranges between the first receiving device and the second receiving device, and similarly, the relative distance between the third length of cable of the second cable system device and the third cable system device corresponds with the distance between the capture ranges of the first receiving means and the second receiving means.

This invention includes a method of controlling the direction of travel of a vehicle to change the path of travel from a through path to a diverging path. This method also includes controlling the direction of travel of the vehicle to get it back from a diverging path on to a through path. Thus, the method provides for controlling the direction of travel through lane changes, turning corners and merging. The method includes equipping the vehicle with a first receiving device capable of receiving a signal preferably modulated to carry information. The method further includes equipping the vehicle with at least one second receiving device capable of receiving a signal, wherein the second receiving device is located a certain lateral distance apart from the first receiving device. This lateral distance is to the right or left of the first receiving device as viewed along the common line of travel of the vehicle. It is most preferred that there be two second receiving devices, one on the left and one on the right of the first receiving device, sometimes called the primary receiving device. The lateral distance between the first receiving device and either second receiving device is preferably a constant with all vehicles using the system and is chosen such that the center of the pick up range of the receiving device is directly over the cable system in the roadway emitting a signal for that receiving means. In this method, and the device described above, the first receiving device always receives the signal from a through, primary or first cable system. A second receiving device either to the right or left always receives the signal from a second cable system on that side, if it happens to be present at that particular location along the roadway. The second cable systems are generally intermittent in nature as they are only located where a change of direction is available. The method also includes laying a first cable system device in a travel surface defining a first line of travel to carry and radiate a signal to the first receiving device. The method further includes laying at least one second cable system device in the road surface at a location where a change from the first line of travel is desired wherein the system device carries and radiates a signal to the second receiving device. The method further includes positioning a first length of cable of the second cable system parallel to the first line of travel, positioning a second length of cable of the second cable system abutting the end of the first length but following a direction of travel divergent from the first line of travel, and positioning a third length of the second cable device abutting the end of the second length but following a direction of travel parallel to a second line of travel. Finally, the method includes laying a third cable system device in a travel surface defining a second line of travel to carry and radiate a signal to the first receiving means in the vehicle.

It is preferred that the vehicle travel control device include a multiple receiver device including a primary receiver to receive a signal generated from a primary cable in a travel surface defining a first line of travel and carrying and radiating a guidance signal. This signal received is relative to the position of the vehicle from the primary cable device. The multiple receiver device also includes a second receiver device positioned on the vehicle to the right of the primary receiver device to receive a signal generated from a second cable device from the travel surface carrying and radiating a guidance signal. This second cable device includes a length of cable parallel to the first line of travel, a second length of cable continuing from the end of the first length and following a direction of travel diverging from the first line of travel and a third length of cable following from the end of the second length a direction parallel to a second line of travel. The multiple receiver also includes a third receiver device positioned on the vehicle to the left of the primary receiver device to receive a signal generated from a third cable device in the travel surface carrying and radiating a guidance signal. The third cable device includes a length of cable again parallel to the first line of travel, a second length of cable continuing from the end of the first length and following a direction of travel diverging from the first line of travel and a third length of cable following from the end of the second length, a direction parallel to a third line of travel. The vehicle travel control device also preferably includes a steering selector switch receiving signals from the receiver means. The computer means is connected to receive signals from the receiver means and choose which of the signals should pass through the steering selector switch. A vehicle steering device receives a signal from one of the receiver devices and corrects the path of the vehicle to correspond with the guidance signal from the cable device.

The vehicle travel control device also preferably includes three diplex radar devices to determine the distance and the relative speed between the vehicle and other objects or ehicles. One of these radar devices is aimed to the front from the vehicle while the others are aimed to the right and to the left. It should be clear that while the above description speaks in terms of three separate radar devices aimed in the directions of movement of the vehicle, that combination also includes a phase array device wherein one radar device uses three antennae or even one movable antennae. The signal from the cable device includes a synchronizing signal which is fed to the computer device to synchronize the radar pulses from the vehicle with those from other vehicles.

The vehicle travel control device also preferably includes a directional signal actuated by the operator to command a change of direction. Preferably, this directional signal must be actuated before the applicable second cable device comes in to the pick up range of the applicable second receiver device so as to insure that there be sufficient time to decelerate to a safe speed for the change in direction. It is also preferred that a vehicle speed transducer device be included to inform the computer device as to the speed of travel of the vehicle.

While this invention has been described with reference to the specific embodiments disclosed herein, it is not confined to the details set forth and the patent is intended to include modifications and changes which may come within and extend from the following claims.

I claim:

1. A system to control a vehicle equipped to receive signals and therefrom control its direction of travel comprising:
   (a) a first cable system means in a travel surface defining a first direction of travel to carry and radiate a signal to be received by a first receiving means in the vehicle,
   (b) at least one second cable system means in the travel surface at any location where a change from the first direction of travel is desired to carry and radiate a signal to be received by a second receiving means in the vehicle, the second cable system means comprising:
      (i) a first length of cable parallel to the first direction of travel,
      (ii) a second length of cable continuing from the end of the first length but following a direction of travel diverging from the first direction of travel, and
      (iii) a third length of cable continuing from the end of the second length, but following a direction of travel parallel to a second direction of travel, and
   (c) a third cable system means in the travel surface separated from said first and second cable means and defining the second direction of travel which is a different route than the first direction of travel to carry and radiate a signal to the first receiving means in the vehicle.

2. The system of claim 1 wherein each cable system means comprises at least one generator means connected to each cable means to generate a signal for a length of cable.

3. The system of claim 2 wherein an oscillator receiver means is connected to each generator means to receive signals to control and change the signals generated from the cable means.

4. The system of claim 1, wherein said vehicle upon receiving the signal from one of the cable system means causes the vehicle to follow the direction of travel of said one cable system means.

5. The system of claim 1, wherein the signal from at least one of the cable system means automatically causes the vehicle to follow the second cable system means when the first direction of travel reaches a parallel relationship with the first length of cable in said second cable means.

6. The system of claim 1, wherein a generator means feeds a signal to each of the cable system means as a guidance signal.

7. The system of claim 1 wherein the first cable system means comprises a first generator means that feeds a signal to a cable indicating the speed the vehicle is to travel as well as a guidance signal along the cable.

8. The system of claim 1 wherein the second cable system means comprises a second generator means that feeds a signal to a cable means indicating the speed of travel of the vehicle following the second cable system means as well as a guidance signal along the cable means.

9. The system of claim 1 wherein the distance between the first cable system means and the first length of cable of the second cable system means is approximately the distance between the centers of the capture ranges of the first receiving means and the second receiving means.

10. The system of claim 1 wherein the distance between third length of cable of the second cable system means and the third cable system means is approximately the distance between the centers of the capture ranges of the first receiving means and second receiving means.

11. The system of claim 1 wherein said second cable system means in the travel surface comprises, a right second cable system means positioned to the right of the first cable system means and a left second cable system means positioned to the left of the first cable system means, wherein the left second cable system means to carry and radiate a signal to be received by a third receiving means in the vehicle, the left second cable system means comprising at least one cable means comprising:
   (i) a first length of cable parallel to the first direction of travel,
   (ii) a second length of cable continuing from the end of the first length but following a direction of travel diverging from the first direction of travel, and
   (iii) a third length of cable continuing from the end of second length, but following a direction of travel parallel to a third direction of travel, and
   (iv) wherein the apparatus further comprises a fourth cable system means in a travel surface defining a third direction of travel to carry and radiate a signal to the first receiving means in the vehicle.

12. The system of claim 1 wherein a shielding means is provided in a cable at a position of intersection between said cable systems to shield the radiation at the point of intersection.

13. A system to control a vehicle equipped to receive signals and therefrom control its direction of travel comprising:
   (a) a first cable system means in a travel surface defining a first direction of travel to carry and radiate a signal from a first generator means generating a guidance signal, wherein the signal is received by a first receiving means in the vehicle,
   (b) at least one second cable system means in the travel surface at any location where a change from the first direction of travel is desired to carry and radiate a signal from a second generator means to generate a guidance signal and a signal indicating the speed of travel of the vehicle during the change in direction, wherein the signal is received by a second receiving means in the vehicle, the second cable system means comprising at least one cable means comprising:

(i) a first length of cable parallel to the first direction of travel, (ii) a second length of cable abutting but not connected to the end of the first length and following a direction of travel diverging from the first direction of travel, and (iii) a third length of cable abutting but not connected to the end of the second length and following a direction of travel parallel to a second direction of travel.

(c) third cable system means in a the travel surface defining the second direction of travel to carry and radiate a signal from a third generator means generating a guidance signal and a signal indicating the appropriate speed of travel along the second direction of travel, wherein the relative distance between the first cable system and the first length of cable of the second cable system means corresponds with the distance between the centers of the capture ranges of the first receiving means and the second receiving means, and wherein the relative distance between the third length of cable of the second cable system means and the third cable system means corresponds with the distance between the centers of the capture ranges of the first receiving means and the second receiving means.

14. A method of controlling the direction of travel of a vehicle equipped to receive signals and therefrom be guided to change the path of travel from a through path to a diverging path comprising:

(a) equipped the vehicle with a first receiving means to receive a signal, (b) equipping the vehicle with at least one second receiving means to receive signal, wherein the second receiving means is located a certain lateral distance apart from the first receiving means, (c) laying a first cable system means in a travel surface defining a first direction of travel to carry and radiate a signal to the first receiving means, (d) laying at least one second cable system means in the travel surface at a location where a change from the first direction of travel is desired, wherein the second system means carries and radiates a signal to the second receiving means, (e) positioning a first length of cable of the second cable system means parallel to the first direction of travel, (f) positioning a second length of cable of the second cable system means abutting the end of the first length, but following a direction of travel divergent from the first direction of travel, (g) positioning a third of length of cable of the second cable system means abutting the end of the second length, but following a direction of travel parallel to a second direction of travel, and (h) laying a third cable system means in the travel surface separate from said first and second cable systems and defining the second direction of travel which is a different route than the first direction of travel, to carry and radiate a signal to the first receiving means in the vehicle.

15. A vehicle travel control system to allow control of direction of travel of a vehicle comprising:

(a) a vehicle multiple receiver means comprising:

(i) a first receiver means to receive a signal generated from a primary cable means in a travel surface defining a first direction of travel and carrying and radiating a guidance signal, wherein the first receiver means receives a signal relative to the position of the vehicle from the primary cable means, and (ii) at least one second receiver means to receive a signal generated from a second cable means in the travel surface carrying and radiating a guidance signal, wherein the second cable means comprises a length of cable parallel to the first direction of travel, a second length of cable continuing from the end of the first length and following a direction of travel diverging from the first direction of travel, and a third length of cable following from the end of the second length a direction parallel to a second direction of travel defining a route different than the first direction of travel, and (b) a computer means to choose and direct one of the signals from the first and second receiver means to a servo means to receive a signal and to control the direction of travel of the vehicle wherein there are two second receiver means one located on the left side of the first receiver means to receive signals from a second cable means located on the left of the first direction of travel and the other second receiver means located on the right side of the first receiver means to receive signals from the second cable means positioned on the right and of the first direction of travel.

16. The system of claim 15 further including a synchronizing signal which is transmitted through the computer means to a diplex radar means on the vehicle to determine the distance and realtive speed between the vehicle and other objects or vehicles, wherein the synchronizing signal synchronizes radar pulses of the vehicle with those from other vehicles.

17. The system of claim 15 wherein there is a steering selector switch connected to receive signals from all the receiver means and the computer means receives signals from the receiver means to choose which of the signals passes through the steering selector switch.

18. The system of claim 15 wherein the signal from each of the cable means includes information as to the appropriate vehicular speed of travel and a radar means on the vehicle to determine the distance and relative speed of objects in the direction of travel and override to control the appropriate speed in view of the position of the objects.

19. The system of claim 15 wherein a directional signal means actuated by the operator to pass a signal to the computer means as to the chosen direction of travel.

20. The system of claim 15 wherein the signal from each of the cable means includes information as to location along the direction of travel that the vehicle has reached at that time.

21. A vehicle travel control system to control the direction of travel of a vehicle comprising:

(a) a vehicle multiple receiver means comprising:

(i) a primary receiver means to receive a signal generated from a primary cable means in a travel surface defining a first direction of travel, carrying and radiating a guidance signal, wherein the first receiver means receives the signal relative to the position of the receiver means from the primary cable means, (ii) a second receiver means positioned on the vehicle to the right of the primary receiver means to receive a signal generated from a second cable means in the travel surface carrying and radiating a guidance signal, wherein the second cable means comprises a length of cable parallel to the first direction of travel, a second length of cable continuing from the end of the first length and following a direction of travel divergent from the first direction of travel and a third length of cable following from the end of the second length in a direction parallel to a second direction of travel, and (iii) a third receiver means positioned on the vehicle to the left of the primary receiver means to receive a signal generated from a third cable means in the travel surface carrying and radiating a guidance signal, wherein the third cable means comprises a length of cable parallel to the first direction of travel, a second length of cable continuing from the end of the first length and following a direction of travel diverging from the first direction of travel and a third length of cable following from the end of the second length a direction parallel to a third direction of travel defining a route different than the first or second direction of travel, (b) a steering selector switch receiving signals from the receiver means, (c) a computer means connected to receive signals from the receiver means and to choose which of the receiving means signals should pass through the steering selector switch and, (d) a vehicle steering means to receive a signal from at least one of the receiver means and correct the path of the vehicle to correspond with at least one of the cable means signals.

22. The system of claim 21 further comprises:
(a) a diplex radar means on the vehicle to determine the distance and relative speed between the vehicle and other objects or vehicles,
wherein the radar means is aimed to the front from the vehicle, to the right, and to the left,
wherein the signal from the cable means includes a synchronizing signal which is fed to the computer means to synchronize the radar pulses from the vehicle with those from other vehicles, and
(b) a directional signal means actuated by the operator to command the computer of a desired change of direction, and
(c) a vehicle speed transducer means to inform the computer means as to the speed of travel of the vehicle.

23. The system of claim 21 wherein if the computer receives a signal that either the second or third receiver means picks up the signal of the primary cable means, the vehicle is either routed off the roadway or stopped.

24. The system of claim 21 wherein if no receiver means is receiving a signal from its respective cable means the computer mans signals the vehicle to stop.

* * * * *